United States Patent Office 3,512,128
Patented May 12, 1970

3,512,128
ENGINE CONTROL WARNING SYSTEM
Walter U. Maki, Cuyahoga Falls, Ohio, assignor to The
Firestone Tire & Rubber Company, Akron, Ohio, a
corporation of Ohio
Filed Apr. 26, 1967, Ser. No. 633,766
Int. Cl. G01c 21/12; B60q 5/00
U.S. Cl. 340—27          3 Claims

ABSTRACT OF THE DISCLOSURE

A warning system to assist in the control of jet engines to preclude heat damage. The warning device continually senses the operating speed of the engine, compares the operating speed with a pre-set minimum sustaining speed, and provides audio and video indications when the operating speed diminishes to a predetermined value approaching or equaling the minimum sustaining speed where corrective measures are necessitated.

BACKGROUND OF THE INVENTION

The expanded use of jet engines in the aircraft industry has resulted in control problems which were nonexistent or less critical in internal combustion engines. These engines typically have a relatively high sustaining speed which is normally on the order of thirty to fifty percent of the maximum speed. When an engine is operated at speeds below the sustaining speed, substantially immediate adjustment of the air-fuel ratio is necessary to prevent over-heating and the resulting deleterious effects on engine components.

When the speed of a jet engine drops below the sustaining speed, the power output of the turbine is insufficient to drive the air compressor at the required speed, thereby causing a deterioration in engine revolutions which is irreversible over a short period of time. This degradation in the air supply to the combustion chamber results in an excessively high fuel concentration which causes the temperature of the combustion components to rise rapidly and produce "hot sections" in the combustion chamber and other downstream components such as the exhaust nozzle, throat section, and tail pipe. The existence of these "hot sections" for even short time periods frequently causes damage requiring the replacement of components at costs amounting to several thousands of dollers.

Conventionally, jet engines have been provided with two types of indicators designed to assist in monitoring combustion temperatures. Initially, each engine is provided with a tachometer which gives a readout of engine speed in revolutions per minute at any time. In addition, many engines are provided with temperature probes in the form of thermocouples located in the exhaust section and providing an indication of temperature on the instrument panel. However, experience with these devices indicates that they are ineffective, since the lag time required for pilot observation, reaction, and correction is of sufficient duration that damage occurs before the appropriate countermeasures can be taken. One reason for the high incidence of this type of casualty is the coincidence of these conditions with operations requiring high degrees of pilot concentration and reaction. A common example exists during landing operations when the engines are cut back to idle after the application of reverse thrust. At this time, the engine speed is commonly quickly reduced to a speed near the sustaining speed contemporaneously with the necessary adjustment and monitoring of numerous other controls. Whatever the surrounding circumstances, adequate and timely warning has proven to be necessary to avoid costly damage to engine components.

SUMMARY OF THE INVENTION

Accordingly, a principal object of the invention is to provide apparatus giving a predominate, timely warning when the speed of a jet engine is reduced to a value approaching its sustaining speed. Another object of the invention is to provide a warning system which will instantaneously respond to an engine reaching a predetermined minimum speed. A further object of the invention is to provide warning apparatus which gives both video and audio indications at the instrument panel. An additional object of the invention is to provide warning apparatus which can be individually pre-set according to the characteristics of individual engines and which provides warning signals as to each individual engine in multi-engine aircraft. Still another object of the invention is to provide warning apparatus which can be installed in existing aircraft, which is inexpensive and compact in size, and which is sufficiently noncomplex so as to be highly reliable and relatively maintenance free.

Various other objects and advantages will appear from the following description taken in conjunction with the attached drawings, and the novel features will be particularly pointed out hereinafter in the appended claims.

DESCRIPTION OF A PREFERRED EMBODIMENT

Figure 1:
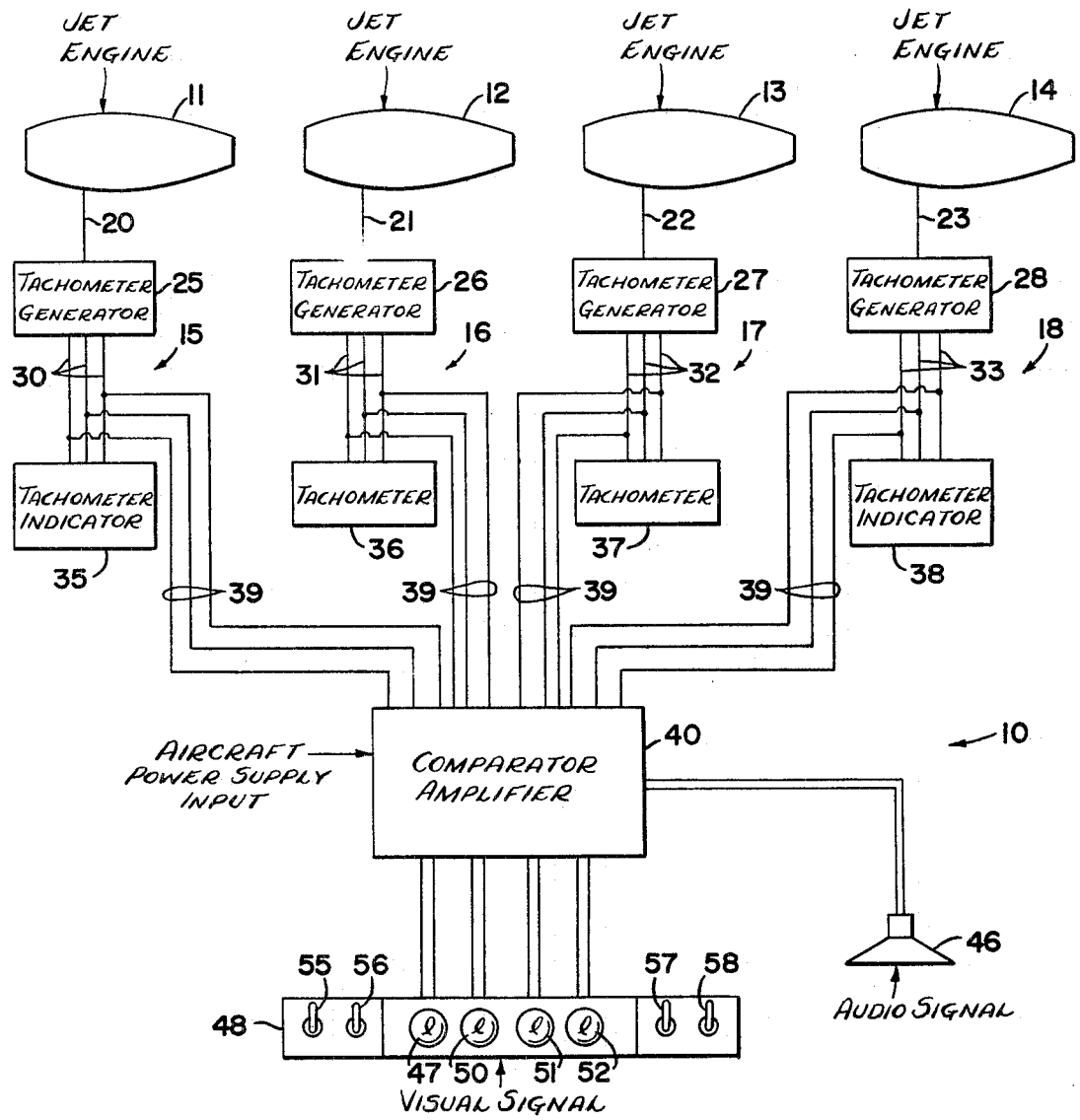
FIG. 1 is a schematic diagram of the overall engine control warning system showing its integration with the engine tachometer system.

Referring generally to the drawings and particularly to FIG. 1 thereof, the subject engine control warning system, generally indicated by the numeral 10, is shown in conjunction with standard control components for an aircraft jet engine. For purposes of explanation, the warning system 10 is depicted schematically as adapted to a multi-engine aircraft having four jet engines 11, 12, 13 and 14.

In accordance with conventional control indicator equipment for jet engines, each engine, 11, 12, 13, and 14 has an associated tachometer system, generally indicated by the numerals 15, 16, 17, and 18, respectively.

Each tachometer system is linked to its respective engine by mechanical linkages 20, 21, 22, 23 normally constituting a drive shaft operated by the engine turbine and connected by suitable gearing to the rotor shafts of tachometer generators 25, 26, 27, and 28 constituting the inputs to the tachometer systems 15–18, inclusive. The rotors of tachometer generators 25, 26, 27, 28 have permanent magnets which induce a voltage into their respective stators to produce a three phase alternating current having a frequency which is proportional to engine speed. The output current of each tachometer generator is directed via three phase transmission lines 30, 31, 32 and 33 to tachometer indicators 35, 36, 37, and 38 which are located on the engine instrument panel. Each tachometer indicator 35, 36, 37, 38 has a synchronous motor with a rotor which is electrically locked to and rotates at the same speed as the rotor of the tachometer generators 25, 26, 27, 28. The synchronous motor rotors are suitably connected to indicator pointers which provide a visual readout of engine speed in percent of maximum revolutions per minute.

The above described tachometer systems 15, 16, 17, and 18 exemplify conventional equipment installed in existing aircraft and do not, per se, constitute a part of the present invention. However, the three phase transmission lines 30, 31, 32, 33 provide an electrical signal which serves as an input indication of engine speed to the warning system 10.

Referring further to FIG. 1, a continuous electrical signal having a frequency representing engine speed is read off of each tachometer system 15, 16, 17, and 18 by individual three phase output or sensor leads 39 tapped into the transmission lines 30, 31, 32, 33. Each of the output or sensor leads 39 is connected to a comparator-amplifier assembly, generally indicated by the numeral 40, which compares the sensor signals with pre-set values and provides an output when the input signal level is less than the pre-set desired minimum value. The comparator-amplifier 40 is preferably provided with individual circuits for each engine in multi-engine aircraft, so that the appropriate engine may be promptly adjusted, and is powered by an input from the aircraft electric system, as necessary.

Figure 2:
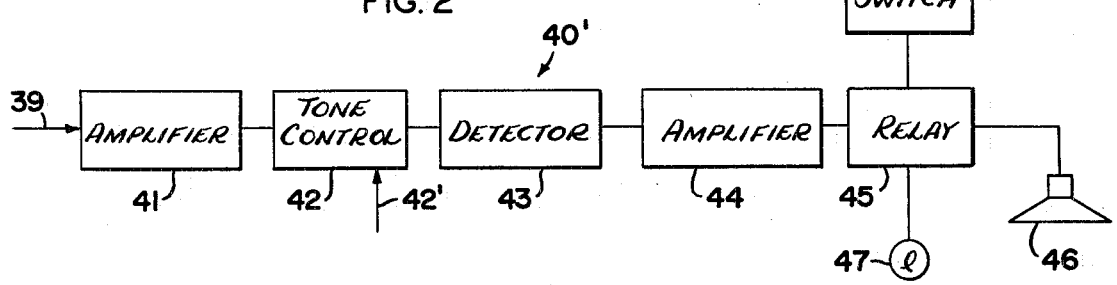
FIG. 2 is a schematic diagram of an exemplary comparator-amplifier circuit adapted to carry out the function of appropriately monitoring and providing signals for one engine.

Referring now to FIGS. 1 and 2, an exemplary circuit for one engine is represented schematically in FIG. 2, as indicated generally by the numeral 40'. The sensor signal 39 to comparator-amplifier 40 is introduced into an amplifier 41 which boosts the signal level to a value suitable for processing in the circuit 40'. Since the representation of engine speed is in terms of signal frequency, the amplified signal may be introduced to a tone control network 42 along with a second input 42' in the form of an adjustable low frequency roll-off point. Thus, the tone control network 42 passes only signals which exceed the low frequency roll-off point, and no signal is passed when the engine speed input is less than the adjustable second input 42'. If each engine is provided with a comparator-amplifier circuit 40', individual settings may be made based on the particular characteristics of each engine.

The output, during normal engine operation, of the tone control network 42 may be introduced to a diode detector rectifier 43 for conversion to a direct current signal. The resulting direct current signal is then suitably boosted by an amplifier 44 to provide a signal which maintains a relay 45 in one of two positions. A second set of contacts on the relay 45 closes circuits to the warning devices described hereinafter, when no signal is present.

In order to provide pilots with optimum warning that one or more engines are at or below minimum sustaining speed, it is highly desirable to provide both audio and video signals. As shown, the relay 45 energizes an electric horn 46, which may be mounted in the cockpit, and an indicator light 47, which may be mounted on the instrument panel 48, simultaneously therewith. Preferably, a single electric horn 46 may be connected in parallel with the circuit 40' for each engine 11, 12, 13, and 14, thereby providing an audio signal when the speed of any engine goes below its minimum sustaining speed. In contrast, it is highly desirable that each engine circuit 40' have an individual warning light to facilitate prompt isolation and correction of the appropriate engine. Thus, in addition to the light 47 as shown for engine 11, the circuits 40' for engines 12, 13, and 14 are provided with indicator lights 50, 51, and 52, respectively.

The relays 45 may be provided with suitable controls to effectively deactivate the warning devices during testing or other operations where it is desirable to deenergize the entire system or portions thereof. As shown the relays 45 for each engine 11, 12, 13, 14 are provided with cutout switches 55, 56, 57, and 58, respectively, which, when activated, maintain the relays 45 in the normally open position.

I claim:

1. Apparatus to assist in the control of the fuel to air ratio in the engines of a jet aircraft comprising, sensor means associated with the tachometer system of each engine and having a frequency signal output representing the operating speed of each engine, comparator-amplifier means for each engine comparing the output of said sensor means from each engine with a preselected minimum frequency signal setting corresponding to the individual characteristics of each particular engine and selectively transmitting a signal, and audio and visual warning signal means responding to the signal of said comparator-amplifier means, whereby timely indication is provided to allow adjustment of the fuel supply to a jet engine to preclude possible damage thereto during operation below the sustaining speed.

2. Apparatus according to claim 1, having a single audio indicator for all engines and individual video indicators for each engine.

3. Apparatus according to claim 2, wherein said audio indicator is an electric horn and said video indicators are lights.

References Cited

UNITED STATES PATENTS 3,174,284 3/1965 McCarthy _____ 60—39.16
3,181,353 5/1965 Brahm et al. _____ 73—116

ALVIN H. WARING, Primary Examiner

U.S. Cl. X.R.

60—39.16; 73—116; 324—69